United States Patent [19]

Verreau

[11] Patent Number: 5,104,538
[45] Date of Patent: Apr. 14, 1992

[54] LIQUID STRAINER

[76] Inventor: Gilles R. Verreau, 195, Place Robert, Lachenaie, Qué., Canada, J6W 5L6

[21] Appl. No.: 682,376

[22] Filed: Apr. 9, 1991

[51] Int. Cl.$^5$ .......................................... B01D 29/085
[52] U.S. Cl. ............................ 210/474; 210/497.2; 210/497.3; 428/137
[58] Field of Search ................. 210/474, 497.2, 497.3, 210/481, 477; 428/137

[56] References Cited

U.S. PATENT DOCUMENTS

| | | | |
|---|---|---|---|
| 752,019 | 2/1904 | Adwen | 210/474 |
| 3,266,411 | 8/1966 | Oakley | 210/497.3 |
| 4,362,624 | 12/1982 | Ueda | 210/497.3 |
| 4,559,140 | 12/1985 | Croteau | 210/497.2 |
| 4,680,117 | 7/1987 | Freeman | 210/497.3 |
| 4,940,189 | 7/1990 | Cremonese | 210/497.2 |

Primary Examiner—Robert A. Dawson
Assistant Examiner—Wanda L. Millard
Attorney, Agent, or Firm—Roland L. Morneau

[57] ABSTRACT

The invention is directed to a liquid strainer and a blank for forming the strainer. The strainer has a conical shape with an apex portion completely surrounded by a filtering cloth and folded from the blank to exclude any unfiltered passageway. The blank has the general shape of a disk truncated about two angularly spaced radial sides, the angle between the sides allowing for formation of a conical shape when the sides overlap. A circular aperture is partly carved at the intersection of the two sides, the remaining portion of the aperture is surrounded by a ring extending from the sides. The aperture is covered by a filtering cloth peripherally adhering to the blank and the ring. When the blank is folded, the ring forms and continuously extends from the latter. The filtering cloth which is glued to the ring completely closes any passageway through the folded cloth.

4 Claims, 4 Drawing Sheets

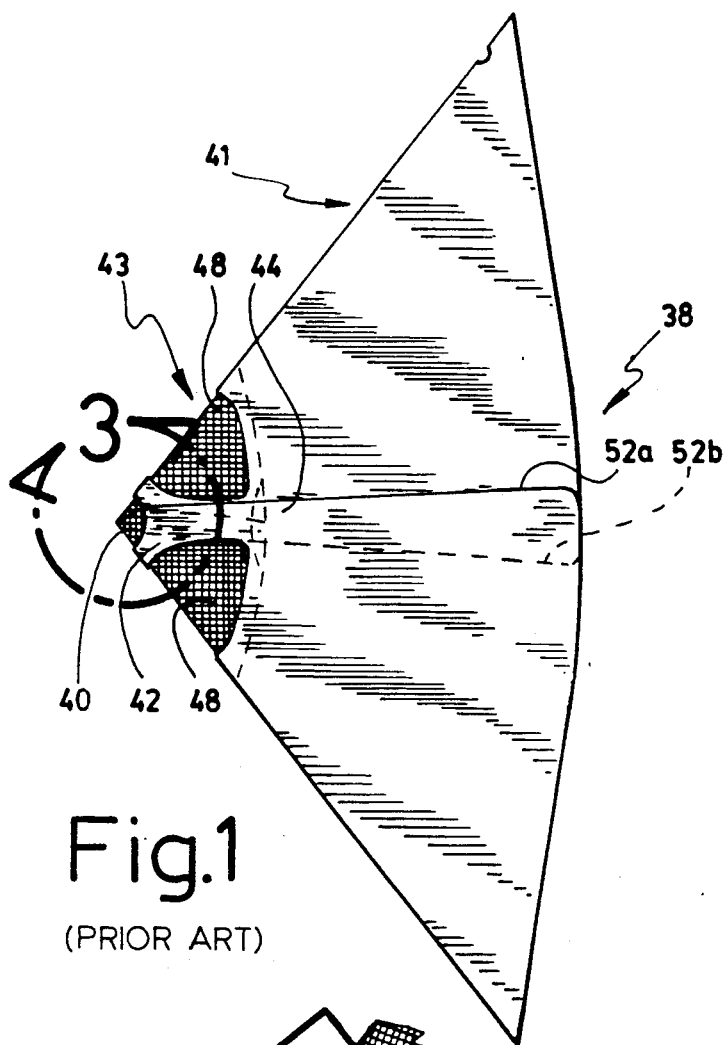
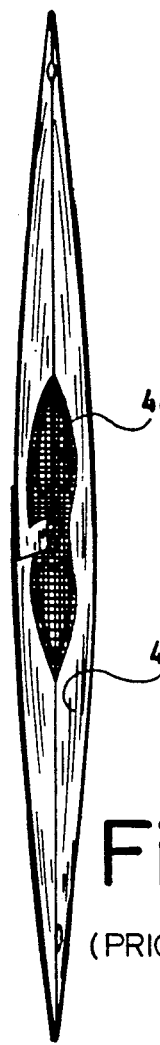
Fig.1 (PRIOR ART)
Fig.2 (PRIOR ART)
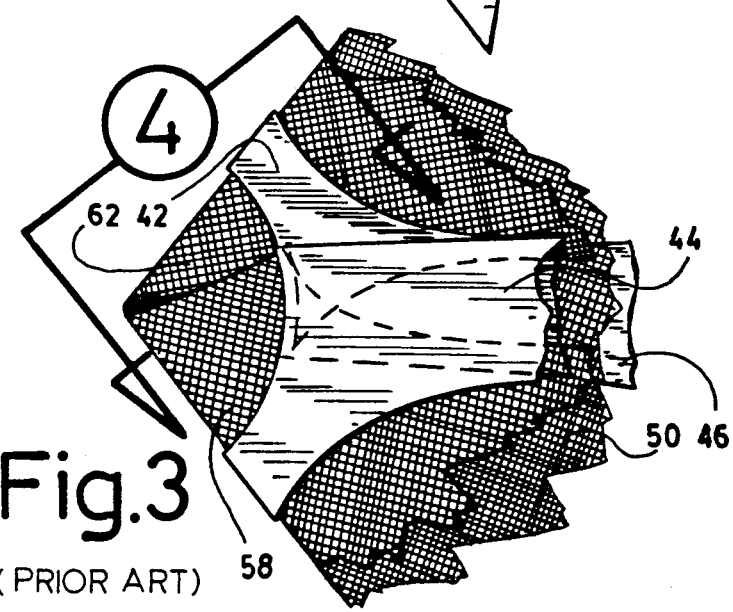
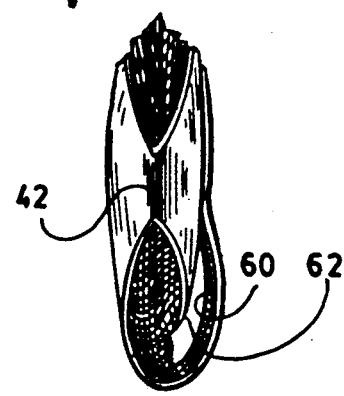
Fig.3 (PRIOR ART)
Fig.4 (PRIOR ART)

LIQUID STRAINER

BACKGROUND OF THE INVENTION

1. Field of the Invention

The present invention relates to a liquid strainer and in particular to a paint strainer.

The novel liquid strainer is generally made of a blank of paper or cardboard folded into a conical shape which is provided with a filter cloth about its apex.

The novel structural combination of the blank and the filter cloth results in a completely sealed strainer which prevents the escape of solid particles through slots in the folded filter cloth.

2. Prior Art

U.S. Pat. No. 4,158,631 to Whelan discloses a cone shaped paint strainer which has an apex made of non-filtering material. The filter cloth is provided only through wall openings extending above the apex, the wall openings being separated by wall portions obstructing the filtering operation of the strainer.

Although U.S. Pat. No. 4,362,624 to Ueda is directed to a double-deck strainer, the filter cloth is positioned in openings adjacent and above the apex, the latter being made of a non-filtering material such as paper or cardboard.

U.S. Pat. No. 3,567,033 discloses a paint strainer in the form of a cone containing diametrically disposed wall openings covered with a filtering material. The portion of the structure below the wall opening is imperforate and so constitutes a small internal well shaped pocket which prevents complete drainage of the paint from the receptacle.

U.S. Pat. No. 4,559,140 discloses a conical strainer having a pair of substantially diametrically opposed reinforcing arms formed integral with the upper portion of the cone and terminating at a pointed free end located at the apex of the cone. Both arms define a lower draining aperture and side filtration apertures. Once again, the reinforcing arms substantially obstruct the drainage of the strainer.

A conical strainer manufactured by Gerson Co. Inc. presents a structure which is intended to be improved by the proposed invention. The Gerson strainer has an upper support portion made of cardboard and a lower filtration portion. A pair of reinforcing arms extend integrally from the upper support portion. Each reinforcing arm bifurcates at its lower end and merges into a circular rim defining a draining apex portion. The filtering apertures are covered with a filtering cloth and located above the rim. The apex portion is made of filtering material folded about two folding lines in order to form a conically tapering drainage apex totally unobstructed by reinforcing arms of any sort. While the filtering apex portion provides an unobstructed drainage, it presents a major drawback since part of the folded filtering cloth making up the apex portion is not secured to any reinforcing structure. Under particular circumstances, a passageway between two adjacent layers of folded filtering material is susceptible of being formed. If a passageway is indeed formed, unfiltered liquid is proned to escape the filter and contaminate the filtered liquid.

The Gerson conical strainer is exhaustively described in the detailed description of the invention of this application.

Accordingly, the present invention relates to a conical strainer which circumvents the above mentioned disadvantages. The strainer embodying the invention is thus adapted to provide a totally unobstructed drainage area located in the apex portion of the cone so that the paint drains completely from the lower end of the filter.

Furthermore, the apex portion of the present invention is totally seal proof thus preventing contamination of the filtered liquid.

SUMMARY OF THE INVENTION

The invention is directed to a liquid strainer and a blank for forming the strainer. The strainer has a conical shape with an apex portion completely surrounded by a filtering cloth and folded from the blank to exclude any unfiltered passageway. The blank has the general shape of a disk truncated about two angularly spaced radial sides, the angle between the sides allowing for formation of a conical shape when the sides overlap. A circular aperture is partly carved at the intersection of the two sides, the remaining portion of the aperture is surrounded by a ring extending from the sides. The aperture is covered by a filtering cloth peripherally adhering to the blank and the ring. When the blank is folded, the ring forms a third layer between the two sides and continuously extends from the latter. The filtering cloth which is glued to the ring closes any passageway through the folded cloth.

BRIEF DESCRIPTION OF THE DRAWINGS

FIG. 1 is an elevational view of a strainer embodying an example of the prior art radially folded in half, the conical strainer having a filtering apex which is not seal proof, FIG. 2 is a right-hand side view of the strainer shown in FIG. 1 illustrating the inside of the strainer, FIG. 3 is an enlarged view of encircled portion 3 illustrated in FIG. 1, FIG. 4 is a side view taken along line 4—4 of FIG. 3, FIGS. 5 and 5a are close up detailed views of the apex portion of the strainer illustrated in FIG. 1 having its radial edges in the process of being seperated when unfolding the strainer from a conical shape to its flat, blank shape.

DETAILED DESCRIPTION OF THE PREFERRED EMBODIMENT

Figures 6, 7:
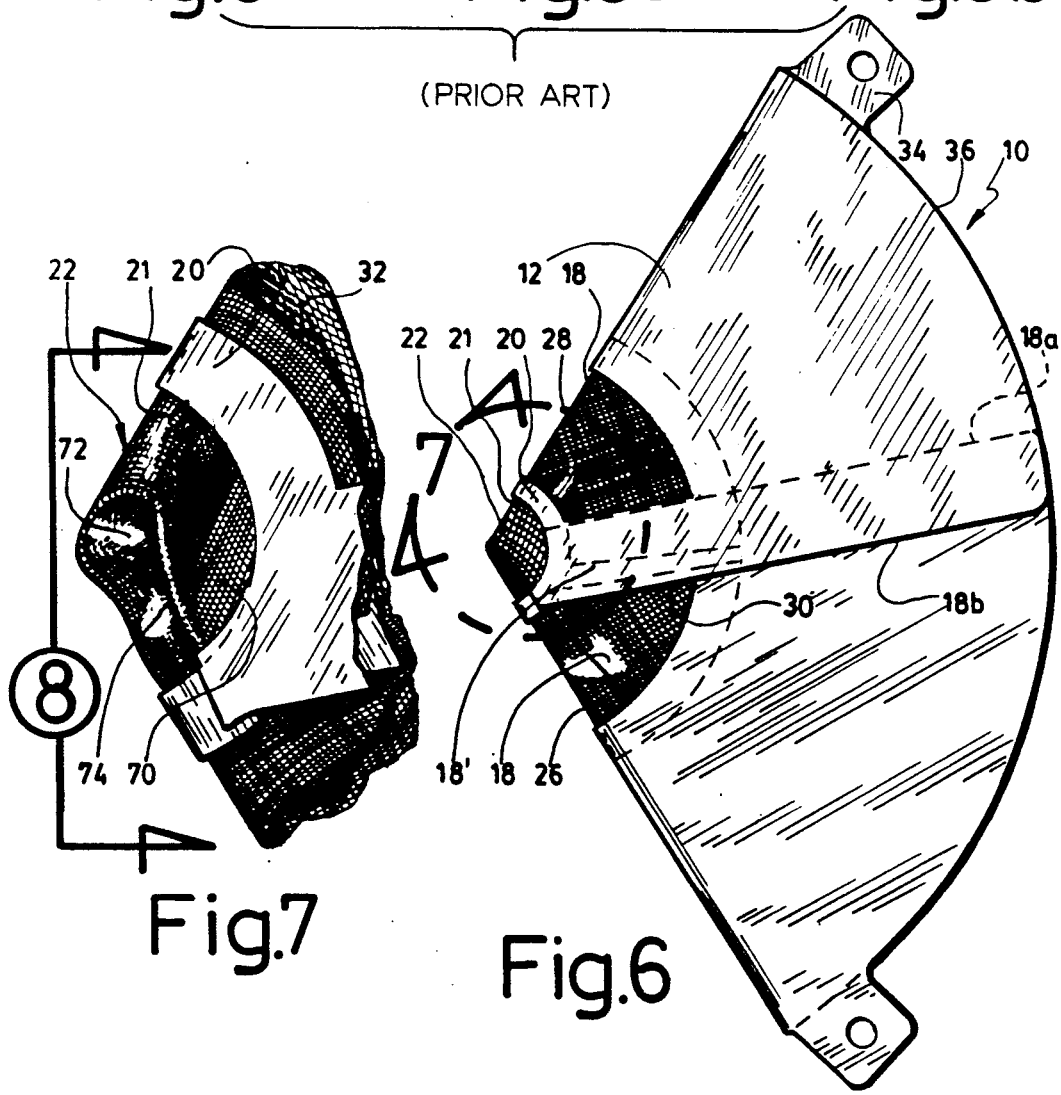
FIG. 6 is an elevational view of the conical strainer embodying the invention radially folded in half.
FIG. 7 is an enlarged detailed view of the encircled apex portion of the strainer taken inside arrow 7 of FIG. 6.

Referring to FIG. 6, there is shown a conical strainer 10 embodying the invention flattened along two diametrically opposite apothems. The strainer 10, when used, is shaped as an open top end conical receptacle having a conically tapering side wall 12 defining an upper support portion 14 and a lower filtration portion 16. The lower filtration portion 16 has a set of reinforcing arms 18 extending integrally from the upper support portion 14 and merging integrally at their lower end portion with a reinforcing rim 20.

One of the reinforcing arms 18 referred to by numeral 18' (FIG. 6) is double-ply. The reinforcing arm 18' is made of two juxtaposed connecting arms 18a and 18b glued together. A filtering apex portion 22 is upwardly delimited by a lower edge 21 of the reinforcing rim 20. A set of side filtering apertures 24 are located above the reinforcing rim 20. Each one of the filtering apertures 24 is defined by a lower edge 26 of the upper support portion 14, an upper edge 28 of the reinforcing rim 20 and, a pair of side edges 30 from adjacent reinforcing arms 18.

A filtering cloth 32 is secured inwardly to the conical tapering side walls 12. The filtering cloth 32 extends over the side filtering apertures 24 and also defines the filtering apex portion 22.

A pair of diametrically opposed perforated ears 34 are formed integrally with the top edge 36 of the upper support portion 14. The ears 34 are provided so that the strainer 10 can be retained over a receptacle such as a paint can.

One of the main advantages of the present invention resides in the fact that the conical strainer 10 can be completely drained through the filtering apex portion 22. The draining apex portion 22 of the present invention is totally unobstructed by reinforcing arms of any sort since the reinforcing structure defining the drainage area is the circular rim 20 located above the draining apex portion 22.

Another main advantage of the present invention is that the draining apex portion is totally seal-proof. FIGS. 1 through 5b illustrate a conical strainer 38 manufactured by Gerson Company Inc. which also uses a centrally disposed draining apex portion 40 defined by a circular rim 42 unobstructed by reinforcing arms such as 44.

In FIGS. 1 through 4, the strainer 38 is folded in half along two of its apothems. The strainer 38 has an upper support portion 41 and a lower filtration portion 43. A first reinforcing arm 44 and a second reinforcing arm 46 extend integrally from the upper support portion 41. Both arms 44 and 46 bifurcate integrally at their lower portion thus merging into the circular rim 42. Side filtering apertures 48 are located above the rim 42.

A filtering cloth 50 secured inwardly to the conical strainer 38 extends over the apertures 48. The filtering cloth 50 also defines the straining apex portion 40.

Figures 5, 5A, 5B:
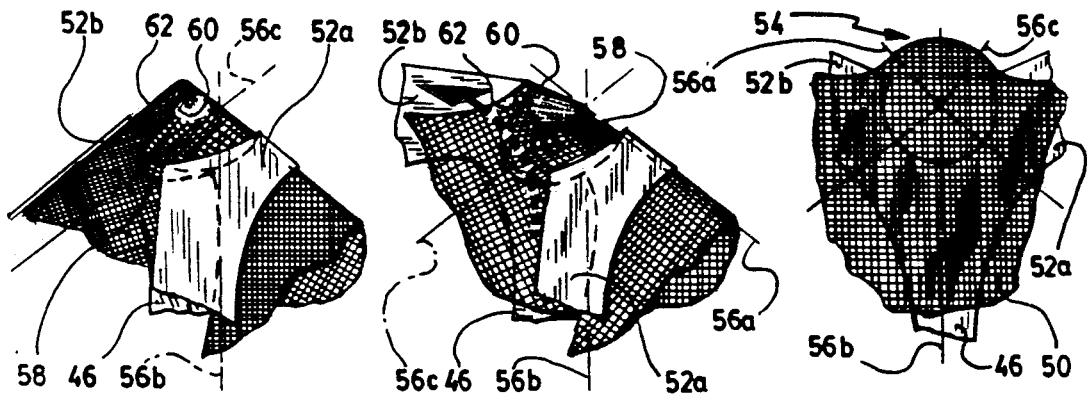
FIG. 5b is an internal view of the completely unfolded apex portion of the blank used to form the conical strainer.

FIGS. 5, 5a and 5b illustrate the portion of the strainer 38 when the latter is gradually unfolded from its conical configuration to a flat blank. The reinforcing arm 44 is made of two connecting arms 52a and 52b glued together in an overlapping relationship. As illustrated in FIG. 5b, a filtering cloth 50, when the blank is totally unfolded, has a substantially arcuate protruding edge 54 located between the connecting arms 52a and 52b. The intersection of the broken folding lines 56a, 56b and 56c represent the top of the apex portion 40 when the blank is folded into its conical shape. A fragment of the filtering apex portion 40 is thus triple layered since layers 58, 60 and 62 overlap when the strainer is folded as shown in FIG. 3.

Since the arcuate segment 54 of the filtering cloth 50 is not glued to any reinforcing structure, the top edges of layers 58 and 60 are free to separate from each other to leave a gap therebetween. The liquid being drained is susceptible of escaping through the unglued passageway remaining unobstructed between the layers 58 and 60 thus contaminating the liquid that has already been filtered.

With the proposed invention, the liquid is prevented from escaping the strainer 10 by the annular rim 20.

Figures 7A, 8:
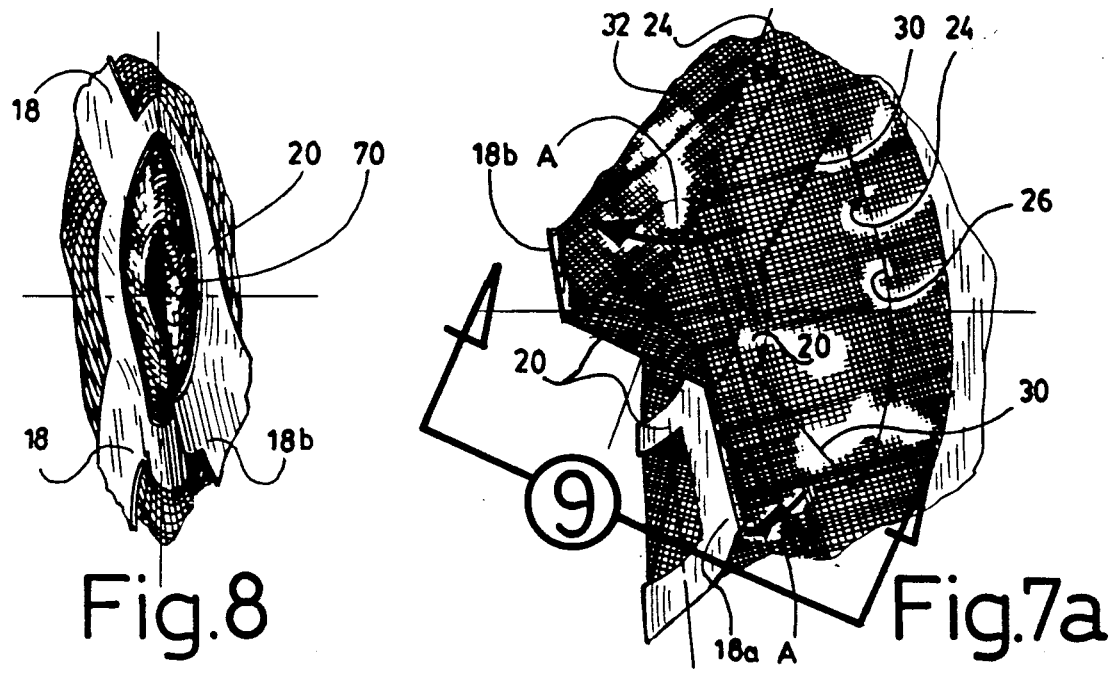
FIG. 7a is a view of the apex portion of the strainer shown in FIG. 7 as it unfolds.
FIG. 8 is a side view taken along arrows 8 of FIG. 7 illustrating the bottom of the apex portion of the strainer.
Figure 9:
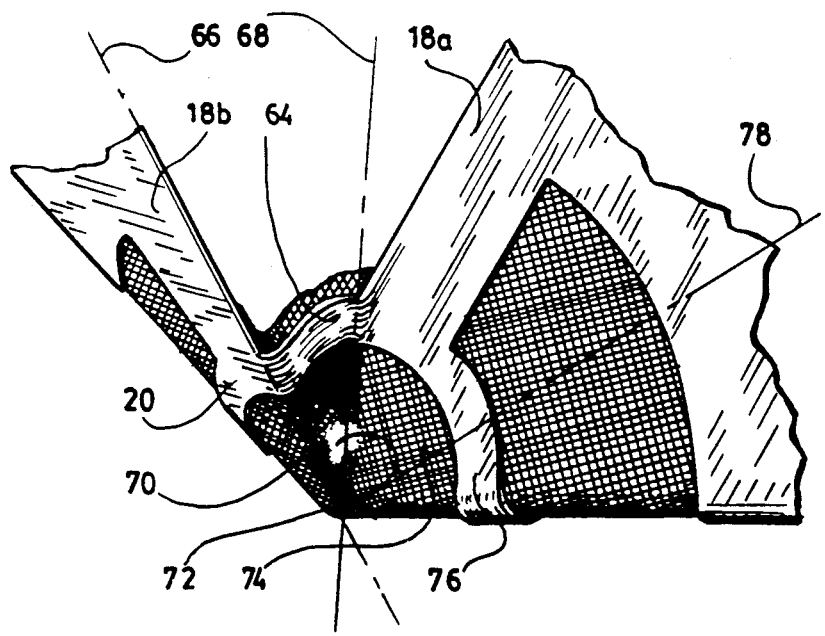
FIG. 9 is a view of FIG. 7a taken along arrows 9.

FIGS. 7a and 9, illustrate the lower filtration portion 16 of the strainer 10 partially unfolded.

The segment 64 of the rim 20 delimited by the folding axes 66 and 68 in FIG. 9 is the structural element which mainly performs the novel sealness characteristic of the apex portion 22.

The segment 64 which is glued to the filtering cloth 74 of which no equivalent existed in the afore-mentioned Gerson's strainer 38 prevents the liquid from escaping unfiltered through an unintentional gap in the strainer 10.

The intersection of the folding axes 66 and 68 represents the top of the apex portion when the blank is folded into its conical shape. A fragment of the filtering rim 20 is thus triple layered since layers 70, 72 and 74 overlap.

During the manufacturing process, the peripheral edge of the folding layer 72 is glued to the inner side of the segment 64 and the other side of the segment 64 is glued to a corresponding segment 76 delimited between axes 68 and 78 in FIG. 9. Since the segments 64 and 76 are glued together, the liquid cannot escape the strainer 10 through the apex portion 22.

Figure 10:
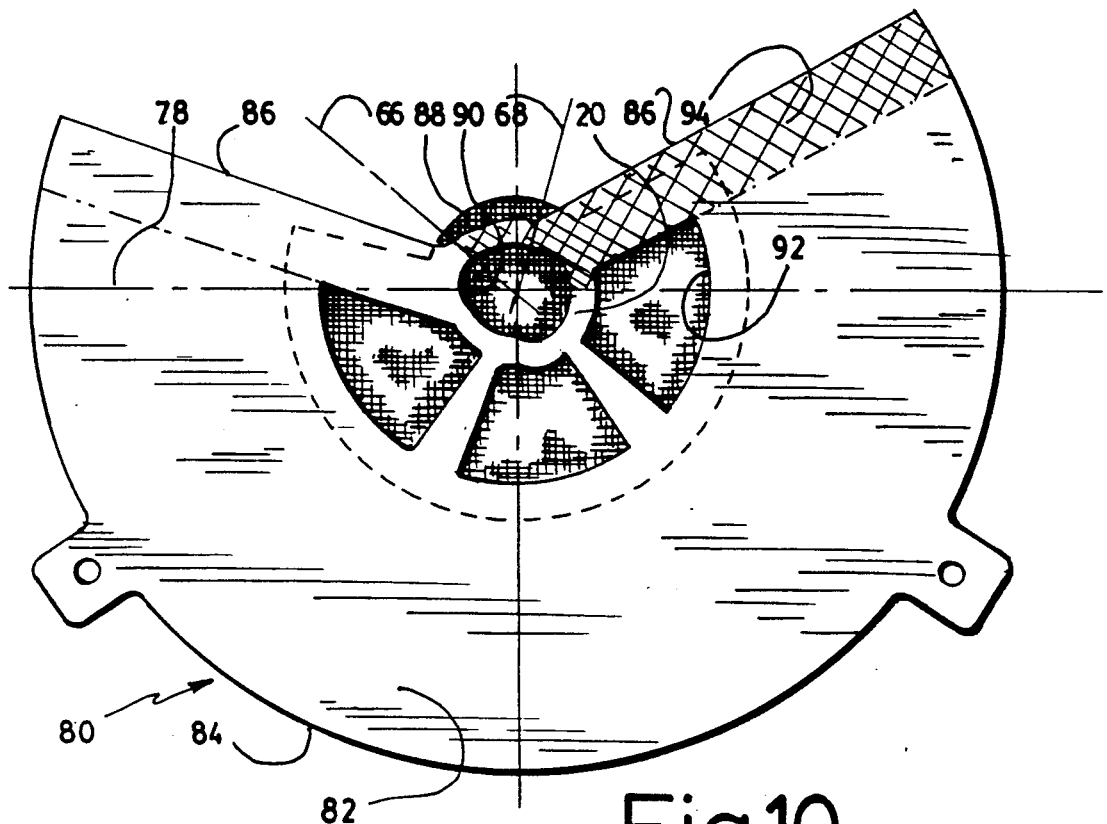
FIG. 10 is a top view of the blank used to form the strainer embodying the invention.
Figure 11:
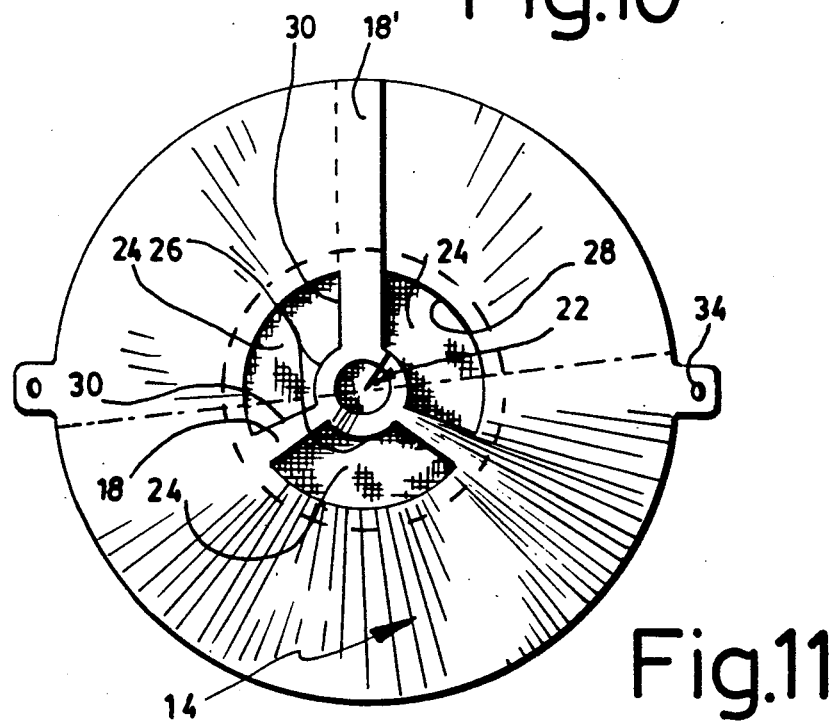
FIG. 11 is a bottom view of the folded conical strainer according to the invention.

Referring now to FIG. 10, is shown a crescent-shaped blank 80, adapted to form the conical strainer 10 embodying the invention. The blank 80 is formed of a flat die-cutted sheet of relatively stiff material, such as rigid paper or light cardboard. The blank 80 has generally the shape of a disk 82 inwardly truncated along two angularly separated radial edges 86 and 86a.

The outer periphery of the blank 80 is defined by a substantially arcuate lower convex edge 84, two substantially radial edges 86 and 86a and a relatively small upper convex arcuate edge 88 connecting the edges 86 and 86a. A disk-shaped cut out 90 is disposed on the center of the truncated disk 82. A set of arcuate trapezoidal shaped cut outs 92 are peripherally disposed around the disk shaped cut out 90 and separated therefrom by the rim 20 which completely surrounds the cut out 90.

The larger hatching pattern 94 illustrated in FIG. 10 represents the positioning of the adhesive strip or coating material used to glue the connecting arms 18a and 18b together and to preferably glue the segment 64 to the segment 76. The glue used for that purpose needs to be resistant to the liquid being filtered by the strainer.

An additional advantage of the present liquid strainer resides in the possibility of forming an apex portion 22 of larger dimensions than the strainers having a potential gap in their apex portion. This is particularly useful for a strainer adapted to sit on a large reservoir or tank having a wide opening.

I claim:

1. A blank for forming a liquid strainer comprising a piece of relatively stiff material having generally the shape of a disk truncated about two angularly spaced radial edges defining a sector-shaped member, said blank having a disk shaped aperture about the intersection of said radial edges, said aperture being partly cut-out from said blank and partly surrounded by a rim portion extending from said truncated disk between said edges adjacent said intersection and outside said sector-shape member, said piece of material being provided with a set of openings peripherally disposed around said aperture, a liquid filtering cloth adhesively fixed to said sheet of material over said aperture and said openings, a strip of adhesive covering said sheet of material adjacent one of said radial edges and a portion of said rim section, whereby said blank is adapted to be folded into a funnel shape by the sealingly overlapping of said edges, and said rim portion is adapted to fold between said edges to form a continuous triple ply therewith, said triple ply being adapted to be sealingly kept together by said adhesive strip covering said portion of said rim and said one of said edges.

2. A blank for forming a liquid filter strainer comprising a generally crescent-shaped sheet of relatively stiff material, said crescent-shape being interiorly delimited by two converging linear radial sides, said blank having a circular aperture at the intersection of said radial sides, said aperture being partly carved into said blank and partly surrounded by a rim portion extending from said radial edges adjacent said intersection and outside said crescent-shape member, said sheet of material being provided with at least one opening peripherally located around said aperture, a liquid filtering cloth adheringly fixed to said sheet of material, said cloth covering said aperture and said opening, a strip of adhesive covering said sheet of material adjacent one of said radial sides, whereby said blank is adapted to form a conical strainer when said strip of adhesive is adhesively fixed to the other of said radial sides in an overlapping relationship, said rim poriton being adapted to form a triple layer continuously extending from and disposed between the adjacent radial sides when said radial sides are overlapping.

3. A strainer for paint made of a blank comprising a piece of relatively stiff material having generally the shape of a disk truncated about angularly spaced radial edges defining a sector-shaped member, said blank having a disk-shaped aperture about the intersection of said radial edges, said aperture being partly cut-out from said blank and partly surrounded by a rim portion extending from said truncated disk between said edges adjacent said intersection and outside said sector-shaped member, said piece of material being provided with a set of openings peripherally disposed around said aperture, a liquid filtering cloth adhesively fixed to said sheet of material over said aperture and said openings, a strip of adhesive covering said sheet of material adjacent one of said radial edges and a portion of said rim section, whereby said blank is folded into a funnel shape with said edges sealingly overlapping and said rim portion folded between said edges, forming a continuous triple ply therewith, said triple ply being sealingly kept together by said adhesive strip covering said portion of said rim and said one of said edges.

4. A strainer for paint made of a blank comprising a generally crescent-shaped sheet of relatively stiff material, said crescent-shaped sheet being interiorly delimited by two converging linear radial sides, said blank having a circular aperture at the intersection of said radial sides, said aperture being partly carved into said blank and partly surrounded by a rim portion extending from said radial edges adjacent said intersection and outside said crescent-shaped sheet, said sheet of material being provided with at least one opening peripherally located around said aperture, a liquid filtering cloth adheringly fixed to said sheet of material, said cloth covering said aperture and said opening, a strip of adhesive material covering said sheet of material adjacent one of said radial sides, whereby said blank forms a funnel-shaped strainer by the overlapping of said radial sides, said rim portion forming a triple layer continuously extending from and disposed between the adjacent radial sides when said radial sides are overlapping, to allow passage of said paint exclusively through the filtering cloth.

* * * * *